(12) United States Patent
Williams (10) Patent No.: US 12,296,526 B2
(45) Date of Patent: May 13, 2025

(54) MULTI-FUNCTION HAND-HELD SQUEEGEE

(71) Applicant: Robert D. Williams, Bowdon, GA (US)

(72) Inventor: Robert D. Williams, Bowdon, GA (US)

(*) Notice: Subject to any disclaimer, the term of this patent is extended or adjusted under 35 U.S.C. 154(b) by 0 days.

(21) Appl. No.: 18/226,342

(22) Filed: Jul. 26, 2023

(65) Prior Publication Data

US 2023/0364852 A1  Nov. 16, 2023

Related U.S. Application Data

(63) Continuation-in-part of application No. 17/000,050, filed on Aug. 21, 2020, now Pat. No. 12,005,629.

(51) Int. Cl.
*B29C 63/00* (2006.01)
*B25G 1/10* (2006.01)
*B29C 63/02* (2006.01)

(52) U.S. Cl.
CPC .......... *B29C 63/0047* (2013.01); *B25G 1/102* (2013.01); *B29C 63/02* (2013.01); *B29C 2063/027* (2013.01)

(58) Field of Classification Search
CPC ................ B29C 63/0047; B29C 2063/027
See application file for complete search history.

(56) References Cited

U.S. PATENT DOCUMENTS

| | | | | |
|---|---|---|---|---|
| D168,831 S | * | 2/1953 | Derlein | D32/42 |
| 4,827,557 A | * | 5/1989 | Siler, Jr. | A61F 9/029 |
| | | | | 15/245.1 |
| 5,809,608 A | * | 9/1998 | Zadro | B41F 15/44 |
| | | | | 15/245.1 |
| D476,786 S | * | 7/2003 | Sakurai | D32/41 |
| D790,789 S | * | 6/2017 | Blom | D32/41 |
| 2008/0307599 A1 | * | 12/2008 | Gray | B29C 63/0047 |
| | | | | 15/245 |
| 2022/0324091 A1 | * | 10/2022 | Li | B25D 1/00 |

* cited by examiner

*Primary Examiner* — Barbara J Musser
(74) *Attorney, Agent, or Firm* — Gardner IP Law, PC (57) ABSTRACT

A hand-held squeegee for applying or installing wraps and/or films to surfaces. The hand-held squeegee includes a blade portion, a handle portion, a ring loop portion, a tool storage pocket for storing a knife, and hooks for wrapping film around the edge of a surface. The ring loop portion can be slipped onto a user's finger so that the squeegee can be conveniently secured to the back of the user's hand when it is not actively in use by the user or when the user is using another tool.

15 Claims, 10 Drawing Sheets

MULTI-FUNCTION HAND-HELD SQUEEGEE

TECHNICAL FIELD

The present invention relates generally to the field of squeegees for applying films and wraps, and more particularly to a hand-held squeegee, with knife pocket for storing a knife and a ring loop, for applying films and other wraps to surfaces, such as for example, surfaces of automotive vehicles.

CROSS-REFERENCE TO RELATED APPLICATION

The present application claims the priority benefit of prior application Ser. No. 17/000,050 filed on Aug. 21, 2020.

BACKGROUND

Applying films and/or wraps to automotive vehicles requires the use of several different tools in quick succession. One such tool is a squeegee which is generally used to apply vinyl wrap to a vehicle and force out any air pockets trapped beneath the film during the installation thereof. Once the wrap is appropriately installed over a desired section of the vehicle, additional wrap overhanging the desired section is trimmed using a cutting utensil, such as a utility knife. In some cases, the wrap must be cut to expose certain features of the vehicle or to match the vehicle's contours. In other cases, a heat gun is used to heat certain sections of the wrap to encourage the wrap to stretch or become more flexible.

Generally, a proper application of films or wraps to a vehicle requires the use of such equipment in successive combinations, and it is common for those using the equipment to either store them away between uses or utilize unsanitary methods of temporarily holding the unused equipment elsewhere, such as in their mouth. For example, once the squeegee is used to remove any air trapped under the wrap during installation, a technician applying the wrap often will trim the wrap using a utility knife and will be required to store away the squeegee until it is needed again. Commonly, the technician will place the squeegee in a tool pouch, to the side, on the ground, or on another surface. However, the squeegee can pick up dirt or other particles from the tool pouch, ground or surface and scratch or tear the wrap upon subsequent use. Having to store away and switch between tools is also time consuming and inefficient. Alternatively, some technicians will hold the squeegee in his/her mouth so he/she can quickly access the squeegee again when needed. However, this is unsanitary and unsafe for the technician.

Accordingly, it can be seen that a need exists for an improved squeegee which can improve the efficiency and sanitary condition of its use in applying films and/or wraps to automotive vehicles and other similar applications. It is to the provision of a hand-held squeegee meeting these and other needs that the present invention is primarily directed.

SUMMARY

In a first example form, the present invention provides a multi-function hand-held squeegee for applying thin, flexible films, pre-mask materials, and/or wraps. The squeegee includes a blade portion and a handle portion. The handle portion supports the blade portion and is attached to the blade portion and the blade extends therefrom. The hand-held squeegee includes a storage port. The storage port is adapted for receiving and securing another hand-held tool, such as for example a knife or cutter commonly used during installation of wraps, pre-masking materials, and/or thin films.

Optionally, a loop portion is attached to the handle portion or, alternatively, formed in the handle portion and is adapted to be slipped over a finger of a user and worn by the user for temporarily storing the squeegee while using some other tool or doing some other task.

Optionally, the loop portion includes a loop portion that extends at least somewhat transverse to the handle such that the handle and the loop portion do not lie in the same plane.

Also optionally, the hand-held squeegee includes at least one curved tool tips for wrapping film around the edges of a surface.

Optionally, the hand-held squeegee includes a blade cover. In one form, blade cover is made of felt. In another form, the blade cover is made of rubber. In still another form, the blade cover is made of silicone.

In another example form, the present invention provides a multi-function hand-held squeegee for applying thin, flexible films, pre-mask materials, and/or wraps. The squeegee includes a blade portion and a handle portion. The handle portion supports the blade portion and is attached to the blade portion and the blade extends therefrom. A loop portion is attached to the handle portion or, alternatively, formed in the handle portion and is adapted to be slipped over a finger of a user and worn by the user for temporarily storing the squeegee while using some other tool or doing some other task.

Optionally, the loop portion includes a portion that extends at least somewhat transverse to the handle such that the handle and the loop portion do not lie in the same plane.

Also optionally, the hand-held squeegee includes at least one curved tool tip for wrapping film around the edges of a surface.

Optionally, the hand-held squeegee includes a storage port. The storage port is adapted for receiving and securing another hand-held tool, such as for example a knife or cutter commonly used during installation of wraps, pre-masking materials, and/or thin films.

In another example form, the present invention relates to a squeegee having a blade portion and a handle portion. The handle portion includes at least one curved tool tip for wrapping film around the edges of a surface. Preferably, the at least one curved tool tip is positioned at a distal end of the handle portion. Optionally, the at least one curved tool tip comprises two curved tool tips. The curved tool tip(s) is(are) useful for wrapping film around an edge of an object or panel.

Optionally, a loop portion is attached to the handle portion or, alternatively, formed in the handle portion and is adapted to be slipped over a finger of a user and worn by the user for temporarily storing the squeegee while using some other tool or doing some other task. Optionally, the loop portion includes a loop portion that extends at least somewhat transverse to the handle such that the handle and the loop portion do not lie in the same plane.

Preferably, the squeegee further comprises an opening adapted for receiving and securing another hand implement, such as for example a knife or cutter.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

While the example embodiments described herein are generally described as useful for wrapping vehicles with film, those skilled in the art will recognize that the invention is not limited to wraps for vehicles, nor to vinyl wraps. For example, the example embodiments could be used for any film including vinyl wrap, Paint Protection Film (PPF) which is typically polyurethane (but can be vinyl), and window tinting (which typically is PET—polyethylene terephthalate). Wrapping can go on vehicles, but it can also be put on a whole host of surfaces, including cars, busses, track vans/trailers, windows, walls, floors, appliances, counters, appliances, coffins, (yes really), brick and or stone walls, to mention a few examples.

Figure 1A:
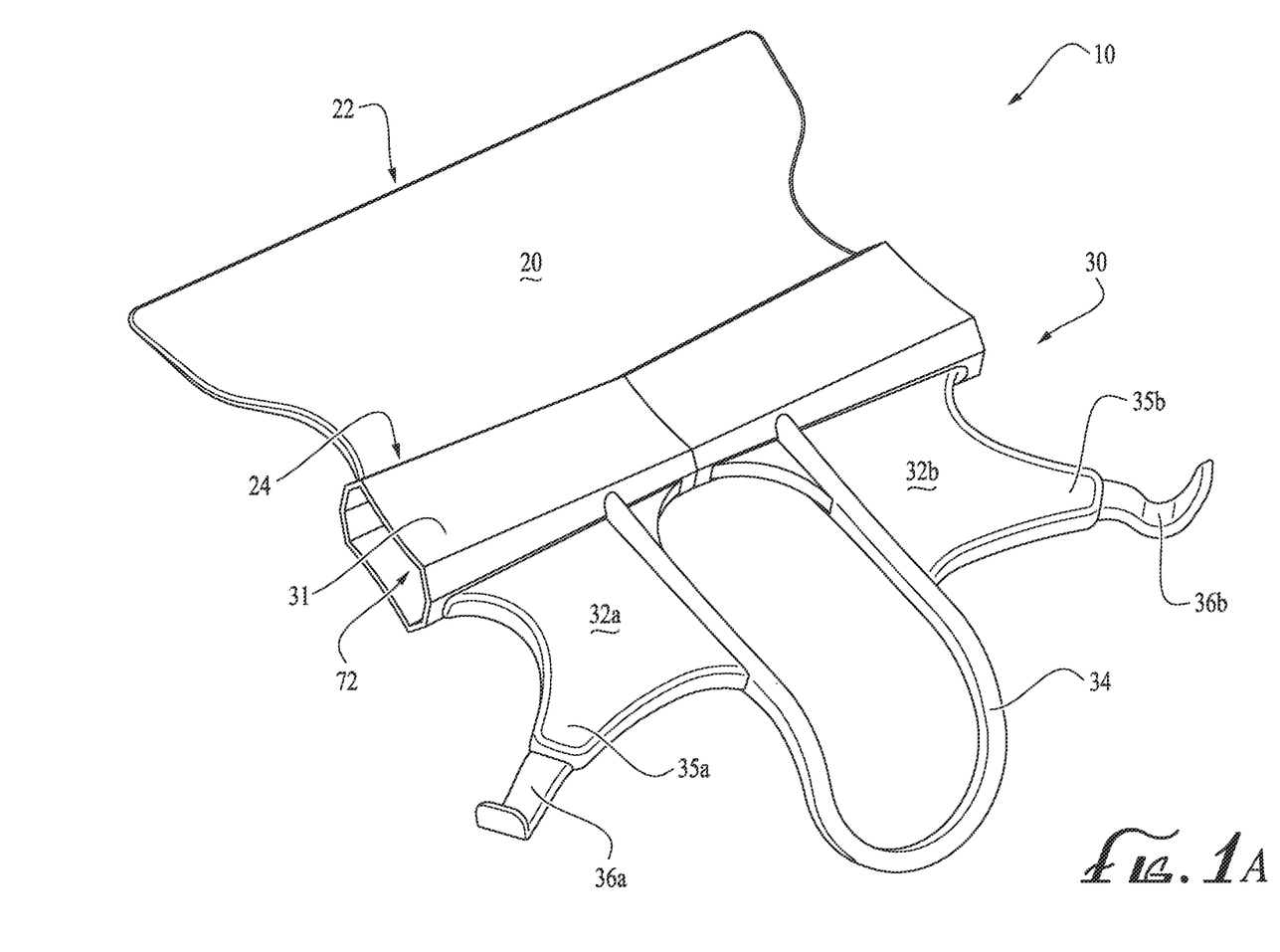
FIG. 1A and FIG. 1B are top and bottom perspective views, respectively, of a hand-held squeegee with a ring loop according to an example embodiment of the present invention.
Figure 1B:
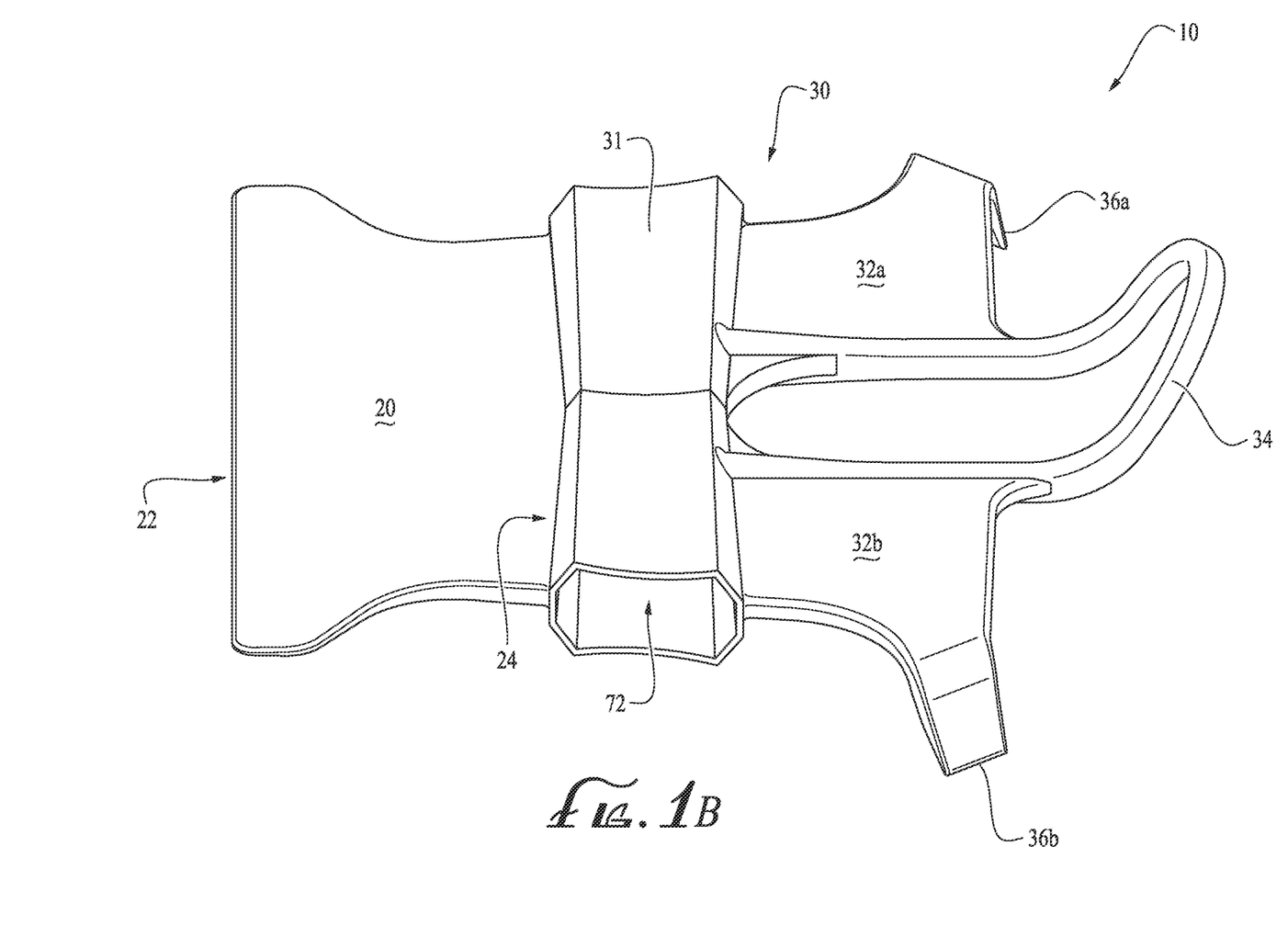
Figure 2:
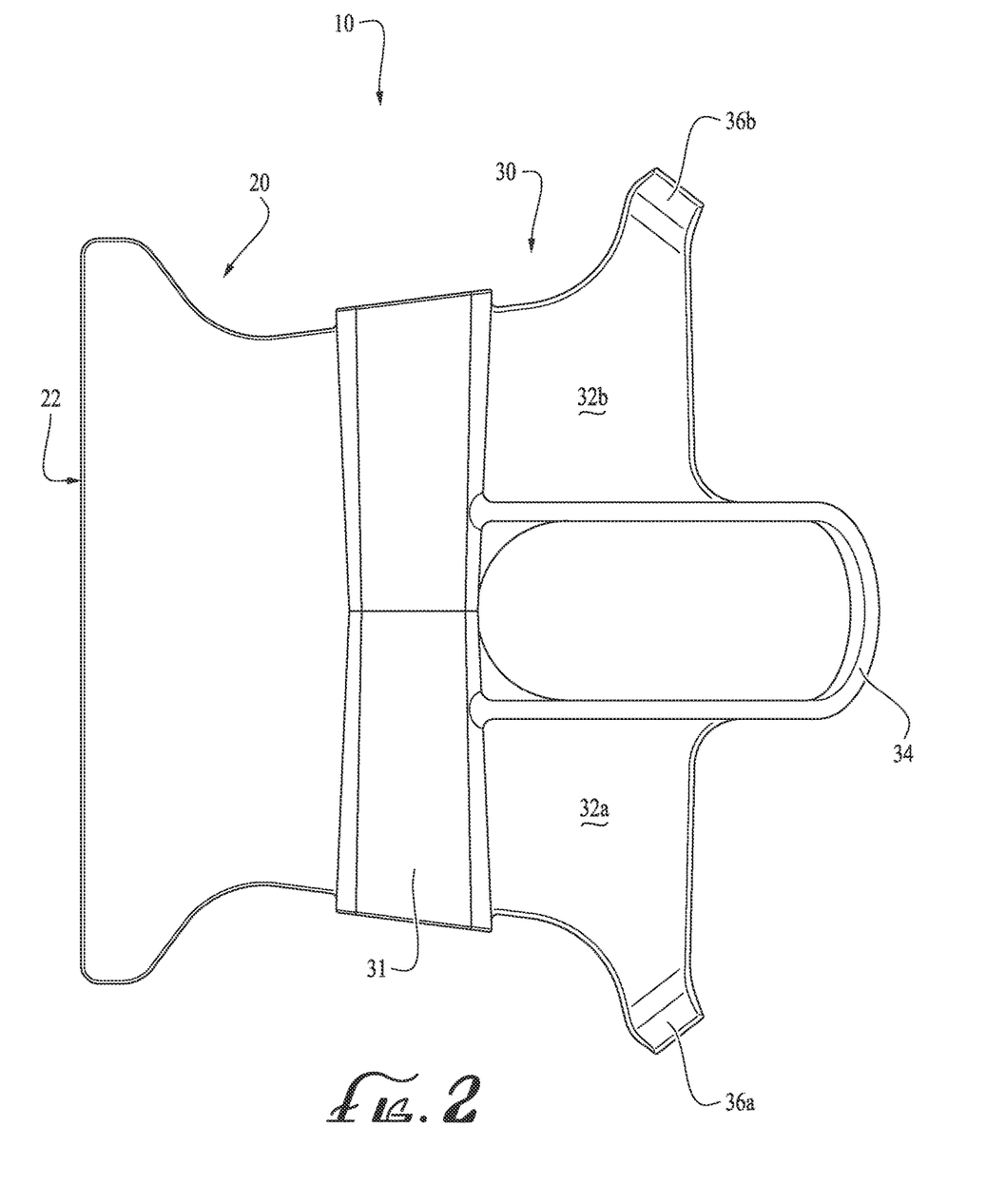
FIG. 2 is a top plan view of the hand-held squeegee of FIG. 1A and FIG. 1B.
Figure 3A:
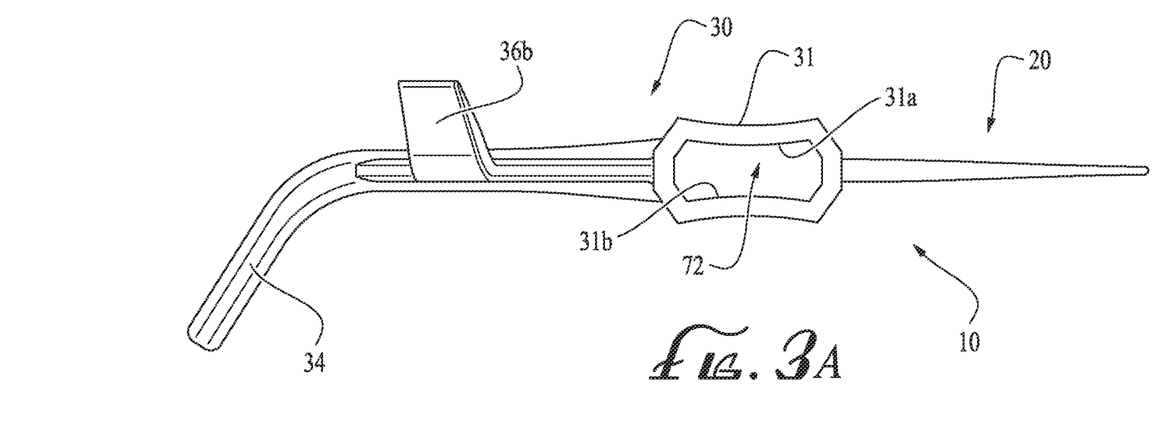
FIGS. 3A and 3B are side elevation views of the view of the hand-held squeegee of FIG. 1A and FIG. 1B in alternative forms.
Figure 3B:
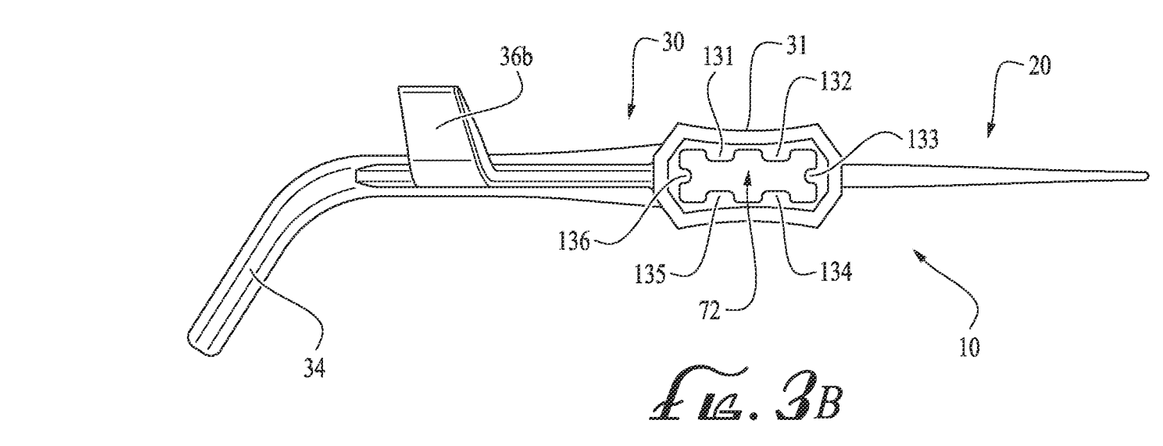
Figure 4:
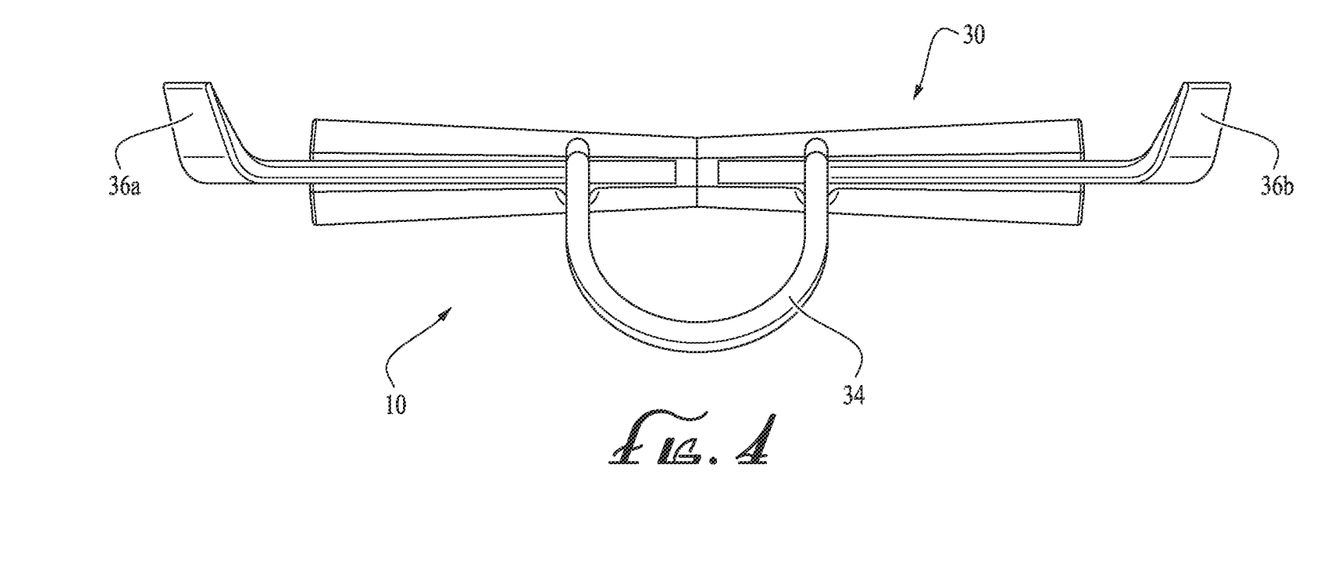
FIG. 4 is a rear view of the hand-held squeegee of FIG. 1A and FIG. 1B.

With reference now to the drawing figures, wherein like reference numbers represent corresponding parts throughout the several views, FIGS. 1-3 show a hand-held squeegee 10 with a ring loop for applying thin, flexible films and/or wraps according to an example embodiment of the present invention. The squeegee includes a blade portion 20 and a handle portion 30. The handle portion 30 is attached to the blade portion 20, and the blade portion 20 extends from and is supported by the handle portion 30.

The blade portion 20 includes a transition end or seam 24 and a blade end or edge 22. The blade portion is connected to the handle portion 30 at its transition end 24 and extends transversely therefrom to the blade end 22. In example embodiments, the length of the blade portion 20 between its transition end 24 and blade end or tip 22 is between about one inch and five inches. Generally, the blade portion is tapered wherein the blade portion is thicker at its transition end 24 than at its blade end/tip 22.

In other example embodiments, the blade portion 20 may comprise a blade end that is thicker than the transition end or the blade portion may comprise a substantially uniform thickness throughout. In the depicted embodiment, the blade portion 20 further comprises an expanded or extended T-profile wherein one half of the blade portion comprising the blade end 22 is wider than the other half of the blade portion comprising the transition end/tip 24. However, those skilled in the art will appreciate that other dimensions and/or profiles can be employed as well.

Figure 6:
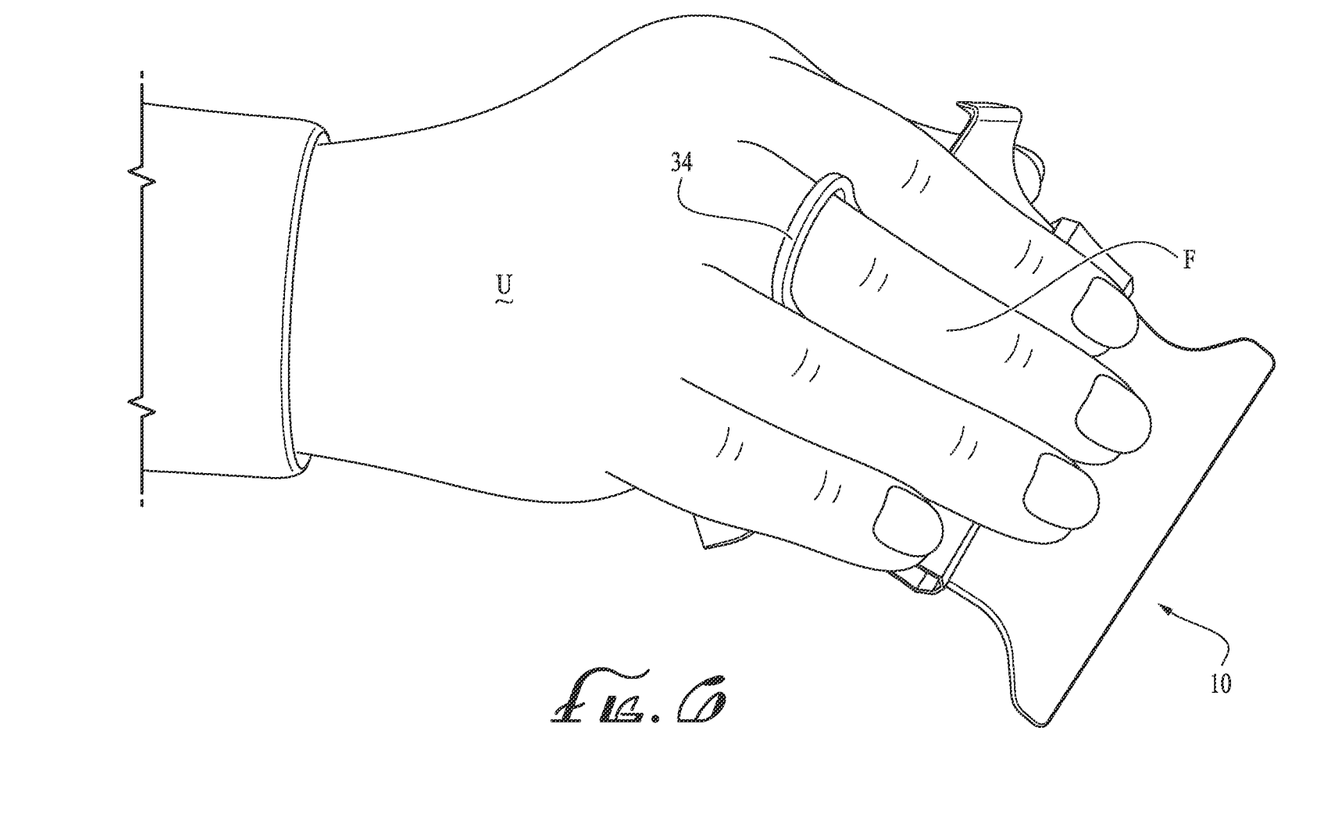
FIG. 6 is a schematic perspective view showing the hand-held squeegee of FIGS. 1A and 1B gripped by a user's hand.
Figure 7:
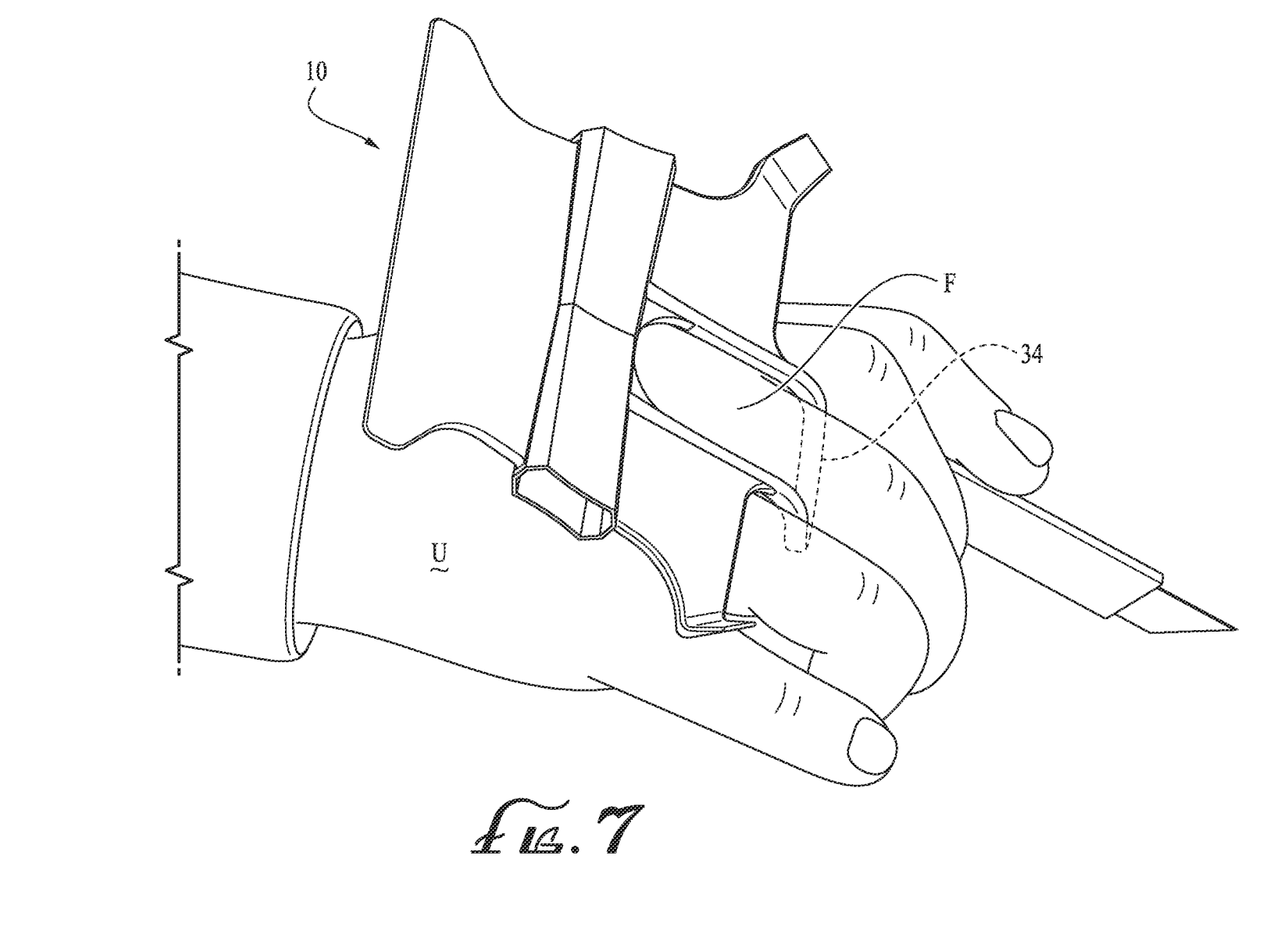
FIG. 7 is a schematic perspective view showing the hand-held squeegee of FIG. 1 on a user's hand with the squeegee blade stored above the back of a user's hand.

As shown in various figures, the handle portion 30 comprises a generally tubular portion 31, first side guard or portion 32a, a second side guard or portion 32b, and a ring loop portion 34. Generally, the first and second side guards extend from the tubular portion 31 in generally the opposing direction from the blade 20. The ring loop portion 34 is attached to or formed in the handle portion 30. The ring loop portion 34 extends between and connects the first and second side guards 32a, 32b, and is adapted to be slipped over a finger of the user. In example embodiments, the ends of the first and second side guards opposite the transition end 24 are connected by the ring loop portion 34. The end part of the ring loop portion 34 also extends generally transversely beyond the side guards to provide clearance for the backside of the user's hand and other fingers F when the squeegee 10 is rotated to the back of the user's hand during non-use, as best shown in FIG. 7. As shown in FIG. 6, the ring loop portion 34 can be slipped over one of the user's fingers during use of the squeegee. In this use, typically, the thumb of the user would be on one side of the handle 30 and the fingers would be on an opposite side of the handle 30. In particular, three or even all four fingers can be presented on the upper side of the handle while the thumb is engaging the underside of the handle, with the handle essentially clamped between the user's fingers. In such use, one of the fingers can be inserted through the ring loop portion 34.

In the depicted embodiment, the ring loop portion 34 is positioned between about the center of side guards 32a and 32b. The corners adjacent both the ring loop portion 34 and side guards 32a and 32b are contoured or filleted to improve the structural integrity and eliminate sharp corners. However, those skilled in the art will appreciate that other configurations, profiles, and/or dimensions can be employed as well.

Figure 5A:
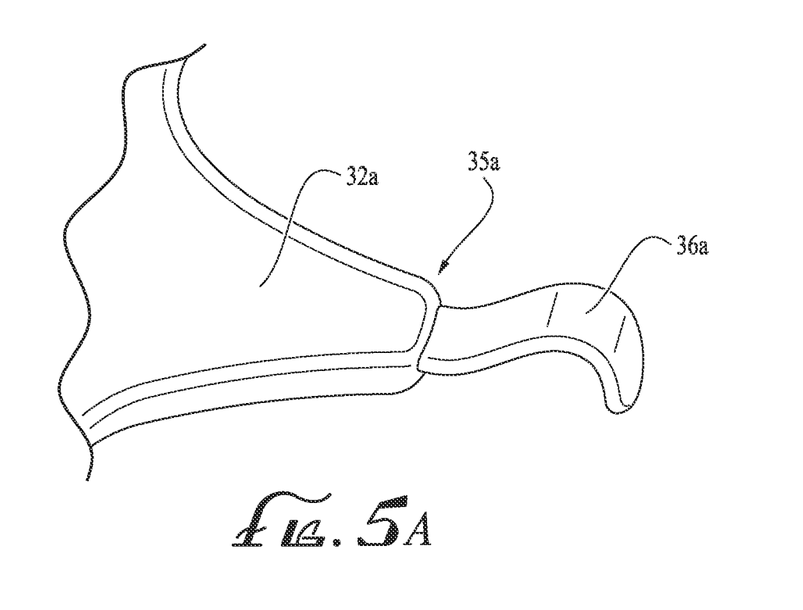
FIG. 5A is a perspective view of a curved tip portion of the hand-held squeegee of FIG. 1A and FIG. 1B.
Figure 5B:
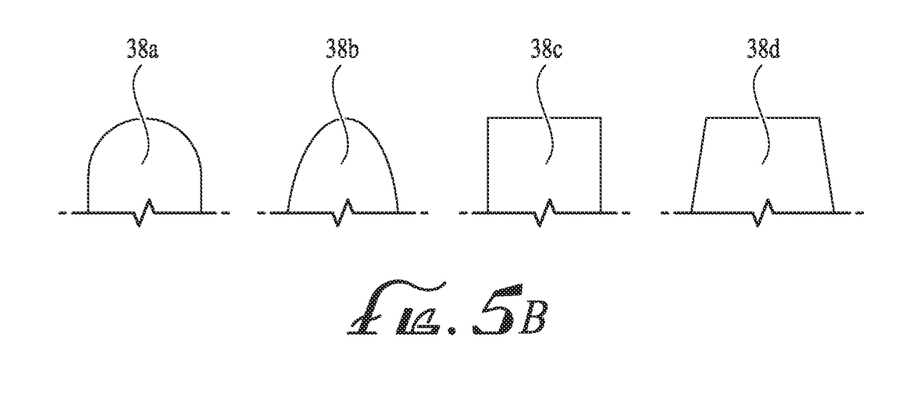
FIG. 5B is a schematic view of alternative embodiments of the curved tip portion of the hand-held squeegee of FIG. 1A and FIG. 1B.

The handle portion 30 also comprises a pair of distal hooks 36a and 36b positioned at the distal corners 35a and 35b of the first side guard or portion 32a and the second side guard or portion 32b, respectively. The hooks 36a, 36b are useful for wrapping film around edges of a surface. They can also be useful for prising up the edge of a trim or rubber molding on a vehicle being wrapped with film. A detailed vie of one of the hooks is shown in FIG. 5A. FIG. 5B shows various profiles of the tips of such hooks in optional configurations. For example, hook tip 38a can be semicircular. Alternately, hook tip 38b can be elliptical. Alternately, hook tip 38c can be rectangular, with somewhat sharply squared off corners. Alternately, hook tip 38d can be tapered. However, those skilled in the art will appreciate that other hook tip configurations, profiles, and/or dimensions can be employed as well.

Figure 8:
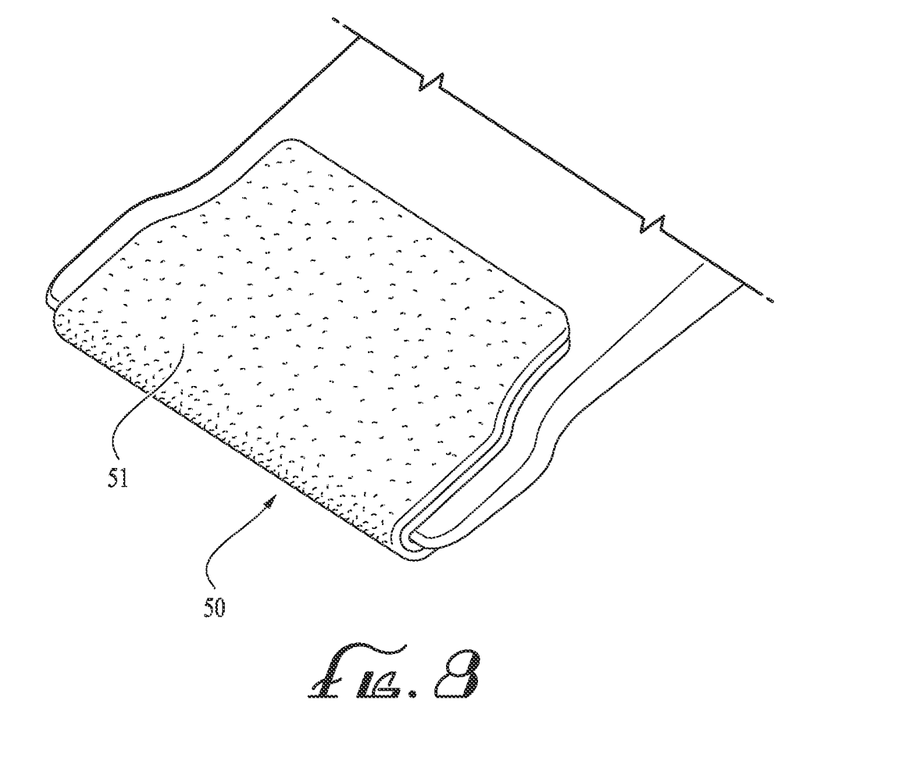
FIG. 8 is a perspective view of a blade portion of hand-held squeegee of FIG. 1A and FIG. 1B and shown having a blade cover portion.
Figure 9:
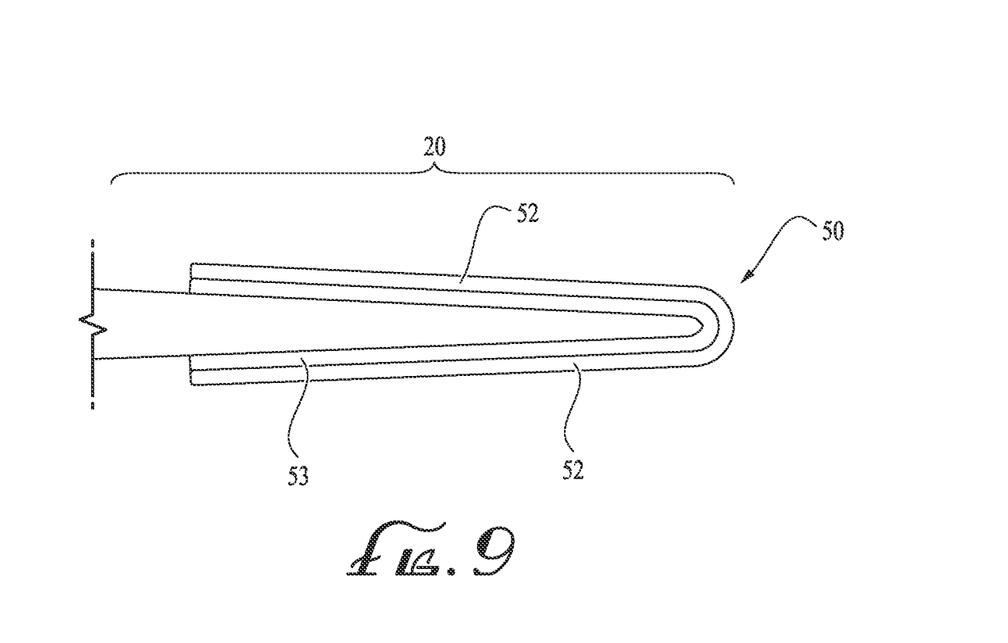
FIG. 9 is a side, end elevation view of the blade portion of the hand-held squeegee of FIG. 8.

The squeegee 10 may further include a blade cover portion or liner 50 secured to or formed on the blade edge 22. The blade cover portion 50 can be made from leather, fabric, rubber, silicone, faux suede, neoprene, plastic and/or other similar materials and laminations or combinations thereof, and be configured to be removably or permanently secured to the blade edge 22. For example, the blade cover portion 50 may be made from felt material comprising a permanent, adhesive backing or a silicone material with a removable, hook-and-loop backing. In the example shown in these figures, the blade cover portion 50 can be made from an artificial or faux suede or suede-like material 51 having an outer layer 52 adhered or bonded to an inner layer 53. For example, the outer layer 52 bears a suede-like surface texture, while the inner layer 53 can be a neoprene layer provided with an adhesive or adhesive backing. The adhesive allows the inner layer to be removably or permanently adhered to the blade edge 22. Further, the outer layer may be laminated to the inner layer. In example embodiments, the outer suede-like layer may be laminated to the neoprene inner layer whereby the neoprene layer provides additional padding to the more delicate outer, suede layer and improves the longevity of the overall blade cover portion. The additional padding assists in maintaining a more consistent pressure and contact between the working application surface and the blade cover portion. It will be appreciated by those skilled in the art that other combinations of materials for the blade cover portion and methods of attaching or securing the blade cover portion to the blade edge can be utilized as well.

Figure 10:
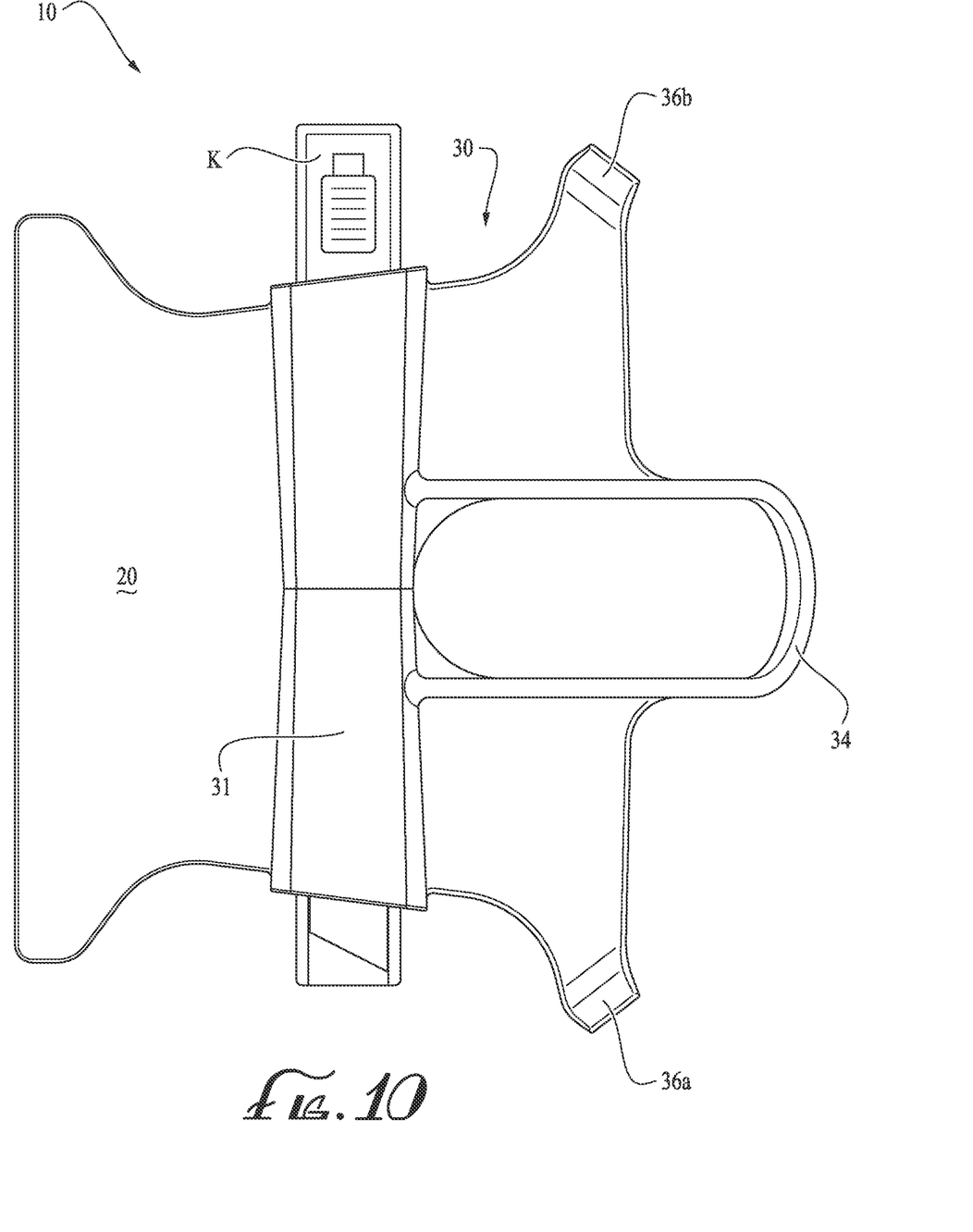
FIG. 10 shows a utility knife removably secured in a storage port formed on a webbing of the hand-held squeegee of FIG. 1.

Preferably, as seen in FIGS. 1A and 1n FIG. 3A, handle 30 further comprises a storage opening or pocket 72 adapted for receiving and temporarily securing or storing another hand-held tool. For example, as shown in FIG. 10, a utility knife K commonly used during the installation of wraps, pre-mask materials, and/or films, can be stored in the storage opening or pocket 72, keeping the knife or tool handy. In the depicted embodiment, the storage port 72 has a generally rectangular profile.

As shown in FIG. 3A, the generally rectangular profile is not a perfect rectangle. Instead, the sides 31a and 31b of the tubular portion 30 are inwardly convex such that the middle of these sides engage and secure the knife K. And with the overall construction being of a somewhat flexible polymer, the sides have some give to them to allow the sides (and the tubular portion 30) to conform to some variations in dimension of knives. However, it will be appreciated by those skilled in the art that the storage port can comprise various shapes and profiles. The pocket or storage opening can be sized and/or shaped to hold the other hand-held tool somewhat snugly, so as to keep it from falling out. Optionally, as shown in FIG. 3B, the pocket can include deformable ribs or fingers 131-136 to help accommodate different sizes of knives/tools and hold the knife or tool securely in the pocket.

In some example embodiments, at least one of the sides may comprise an arcuate edge curved toward the center of the storage port. For example, see sides 31a and 31b. The arcuate side is adapted to resiliently bend away when a tool is inserted through the storage port and to apply pressure against the tool, thereby securing the tool in the storage port. In still other example embodiments, the edges of the arcuate sides can be formed from or affixed with a non-slip material, such as for example rubber or polyvinyl chloride (PVC), providing additional slip-resistance or friction to prevent any secured tool within the storage port from being accidentally or unintentionally slipping out or removed from therein.

In example embodiments, the squeegee 10 is formed as a singular or unitary device or apparatus. The squeegee preferably may be made from various materials, especially rigid or semi-rigid polymers. In other embodiments, the squeegee may comprise an assembly of two or more components secured to one another using adhesives; welding; mechanical assembly means, such as for example, snap-fit mechanisms; and/or other similar methods of mechanical joining known in the art. For example, the blade portion 20 and handle portion 30 may be distinct components secured to one another to form the squeegee. Alternatively, the squeegee may comprise two symmetrical halves secured to one another. One or more edges and/or corners of the squeegee may be rounded or radiused to remove sharp edges or corners that can potentially tear or scratch the wrap or film during installation.

According to example methods of use, the squeegee 10 is used to apply wraps and/or films to a surface, such as for example, the exterior surface of an automotive vehicle. Generally, the squeegee is slipped over or around one of the user's fingers by inserting a finger F of the user U through the opening formed by the side guards 32a and 32b and the ring loop portion 34. The squeegee can be worn on the back side of the hand when not in use, with the user's finger so slipped in the ring loop 34 and the squeegee resting on the back-side of the user's hand, and the blade portion 20 rotated safely away from the applicable surface, when the squeegee is not in use, as shown in FIG. 7. When the squeegee is needed for working, it is rotated back around the user's finger to the palm-side of the user's hand and its handle portion 30 is gripped securely between the user's fingers and thumb, as shown in FIG. 6. The contoured profile of the handle portion 30 provides a grip and helps prevent accidental slippage or misuse. The hand-held squeegee according to example embodiments of the present invention allows the squeegee to be worn around the user's finger so that it need not be stored away between uses or held in any unsanitary manner while the user U is using other tools. Additionally, storage port 72 provides the user with a convenient alternative for storing at least one of the other tools, such as for example a utility knife, when either the squeegee is in use and/or the at least one of the other tools is not in immediate use.

While the invention has been described with reference to example embodiments, it will be understood by those skilled in the art that a variety of modifications, additions and deletions are within the scope of the invention, as defined by the following claims.

What is claimed is:

1. A hand-held squeegee for applying thin, flexible films, the squeegee comprising:
   a blade portion;
   a handle portion attached to and extending from the blade portion for supporting the blade portion; and
   wherein the handle portion includes a pocket for receiving and storing a knife and wherein the pocket includes internal flexible elements for engaging and securing the knife in the pocket.

2. The hand-held squeegee of claim 1, further comprising a loop portion adapted to be slipped over a finger of a user and worn by the user, the loop portion attached to or formed in the handle portion.

3. The hand-held squeegee of claim 2 wherein the loop portion is adapted to be slipped over the finger of the user so that when not in active use, the squeegee can rest on the back of the user's hand and for active use the squeegee can be rotated back around the user's finger to the palm side of the user's hand.

4. A hand-held squeegee for applying thin, flexible films, the squeegee comprising:
   a blade portion;
   a handle portion attached to and extending from the blade portion for supporting the blade portion; and
   one or more hooks extending from the handle portion for wrapping film around surface edges, wherein the one or more hooks comprises two hooks positioned at distal ends of the handle portion.

5. The hand-held squeegee of claim 4, further comprising a loop portion adapted to be slipped over a finger of a user and worn by the user, the loop portion attached to or formed in the handle portion.

6. The hand-held squeegee of claim 5, wherein the loop portion is adapted to be slipped over the finger of the user so that when not in active use, the squeegee can rest on the back of the user's hand and for active use the squeegee can be rotated back around the user's finger to the palm side of the user's hand.

7. A hand-held squeegee for applying thin, flexible films, the squeegee comprising:
   a blade portion;
   a handle portion attached to and extending from the blade portion for supporting the blade portion;
   one or more hooks positioned at distal ends of the handle portion, wherein the hooks are curved such that they point in a direction transverse to the handle portion; and
   a loop portion adapted to be slipped over a finger of a user and worn by the user, the loop portion attached to or formed in the handle portion.

8. The hand-held squeegee of claim 7, wherein the handle includes a pocket for receiving and storing a knife therein.

9. The hand-held squeegee of claim 8, wherein the pocket includes internal flexible elements for engaging and securing the knife in the pocket.

10. The hand-held squeegee of claim 7 wherein the loop portion is adapted to be slipped over the finger of the user so that when not in active use, the squeegee can rest on the back of the user's hand and for active use the squeegee can be rotated back around the user's finger to the palm side of the user's hand.

11. A hand-held squeegee for applying thin, flexible films, the squeegee comprising:
    a blade portion;
    a handle portion attached to and extending from the blade portion for supporting the blade portion; and
    two or more hooks positioned at distal ends of the handle portion and extending from the handle portion for wrapping film around surface edges and wherein the hooks are curved such that they point in a direction transverse to the handle portion.

12. The hand-held squeegee of claim 11, wherein the handle includes a pocket for receiving and storing a knife.

13. The hand-held squeegee of claim 12, wherein the pocket includes internal flexible elements for engaging and securing the knife in the pocket.

14. The hand-held squeegee of claim 11 further comprising a loop portion adapted to be slipped over a finger of a user and worn by the user, the loop portion attached to or formed in the handle portion.

15. The hand-held squeegee of claim 14 wherein the loop portion is adapted to be slipped over the finger of the user so that when not in active use, the squeegee can rest on the back of the user's hand and for active use the squeegee can be rotated back around the user's finger to the palm side of the user's hand.

* * * * *